UNITED STATES PATENT OFFICE 2,470,115

ORGANIC POLYSULFIDES

William D. Stewart, Yonkers, N. Y., assignor to The B. F. Goodrich Company, New York, N. Y., a corporation of New York No Drawing. Application June 13, 1945, Serial No. 599,316

5 Claims. (Cl. 260—17.5)

This invention relates to improvements in the formation of organic polysulfides and more particularly to the formation of organic polysulfides in aqueous emulsions or dispersions.

According to this invention, I am able to secure the organic polysulfide polymers made by the reaction of a water-soluble polysulfide and an organic compound having at least two carbon atoms each of which is attached to a substituent split off during the reaction and especially the organic polysulfides having 2.5 to 4 sulfur atoms or higher in their empirical formulae, in a form such that the polysulfide products may not only be readily and rapidly washed free from inorganic salts and other undesirable constituents, but they may also be dried rapidly.

Furthermore, by operating in accordance with the present invention, I am also able to secure the organic polysulfide polymers referred to above in the form of an aqueous emulsion or latex, which can be readily purified, and from which the organic polysulfide polymers may be coagulated, either before or after the incorporation into the latex of desired compounding ingredients. In addition, by securing the plastic material in a dispersed state as a latex, I am able to coat or impregnate such absorbent material as fabrics, textiles, fibers, paper, leather, and the like, as well as such non-absorbent materials as synthetic filaments and fibers, wood, metal, concrete, and others, with latex and subsequently cause the coagulation in situ of the desired organic polysulfides.

These organic compounds which are the reactants used in the preparation of organic polysulfide polymers have the graphical skeleton carbon structure

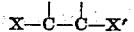

where

represents two adjacent carbon atoms or

where

represents two carbon atoms joined to and separated by intervening structures, and where X and X' represent the substituents which split off during the reaction. The intervening structure between the pair of reactive carbon atoms is selected from the following classes: saturated straight chain carbon atoms, saturated branched chain carbon atoms, unsaturated carbon atoms, ether linkages, aromatic structures, and others, for it is to be understood that other intervening structures may be employed. The X and X' substituents can be halogen, acid sulfate, nitrate, acid phosphate, bicarbonate, formate, acetate, propionate, laurate, oleate, stearate, oxalate, acid malonate, acid tartrate, acid citrate, and others.

In carrying out my invention, I prepare an aqueous emulsion containing a water-soluble polysulfide and a disubstituted organic compound described above by employing a suitable salt-stable emulsifying agent and then causing the organic polysulfide or reaction product to be formed in the aqueous emulsion. As suitable emulsifying agents or dispersing agents, I may employ any salt-stable compound which is highly hydrophobous in nature having a hydrophobic group as one component and a hydrophilic group as the other. The emulsifying or dispersing agents preferred for the formation of latices of small particle size are those having such groups as $SO_3$, $SO_4$, $NH_2$, $NO_3$, etc., as the hydrophilic component and a higher molecular weight alkyl, aralkyl, aryl or alkyl aryl group as the hydrophobic component. The more hydrophobic the entire compound becomes, the smaller the polymer particle size becomes in the latex.

Compounds which are most suitable as emulsifying or dispersing agents for latex formation are the lignin sulfonates such as calcium and sodium lignin sulfonates, alkyl benzene sulfonates having more than 20 carbon atoms in the alkyl group, aryl alkyl sulfonates especially the one sold under the trade name of Daxad 23, sorbitan monolaurates especially those which are oil soluble and slightly water soluble, and others. The dominance of the hydrophobic groups over the hydrophilic groups is one of the important factors in producing a latex of small particle size. The molecular weight of the hydrophobic group alone is not the deciding factor, for aryl groups, for example, may be more hydrophobic than an alkyl group of like molecular weight. Aryl alkyl groups are more hydrophobic than alkyl aryl groups of the same molecular weight. Thus, by selection of emulsifying or dispersing agents, the particle size of the latex can be varied to suit any particular needs.

Also, by the proper selection of the emulsifying agent, I may obtain the polymer as a porous pea size pellet or crumb, a porous bird shot size pellet, as well as a particle of about 1 to 3 microns in size, or less than one micron in size when in a stable latex form. Emulsifiers which can be used are sorbitan monolaurates; alkyl aryl sulfonates; alkyl aryl sulfates; aryl alkyl sulfonates; aryl alkyl sulfates; lignin sulfonates; methyl cellulose; sulfonated petroleum fractions; polymerized alkyl aryl sulfonates; polymerized aryl alkyl sulfonates; soybean lecithin; and the like. The particle size can be controlled by selecting emulsifying or dispersing agents having different molecular weight hydrophobic groups as well as different hydrophobic groups. In the case of the alkyl benzene sulfonates, compounds having an alkyl group of 4 to 5 carbon atoms will cause crumbs of larger than pea size to form, compounds having alkyl groups of 12 carbon atoms produce "pea" size crumbs, compounds having alkyl groups of 22 to 23 carbon atoms produce "bird shot" size crumbs, and compounds having greater than 25 carbon atoms will produce latices with particles about one micron in size. A polymeric alkyl aryl sulfonate of the trade name Daxad 11 produces a particle of "bird shot" size while a polymeric aryl alkyl sulfonate of the trade name of Daxad 23 produces latices having particles less than one micron in size as do the lignin sulfonates. Thus, it is evident, that the larger the hydrophobic group and the more hydrophobic the group becomes, the smaller the alkylene polysulfide particle becomes. The above is all discussed on the basis of comparable concentrations, for the particle size varies directly with the concentration.

As pointed out in prior patents and in the literature, organic polysulfides are produced by reacting a water-soluble polysulfide having the desired sulfur content with an organic compound having two carbon atoms each of which is attached to a substituent split off during the reaction. Since the water-soluble polysulfide is the least expensive of the reactants, it is employed in excess to insure a near complete consumption of the organic reactant. The water-soluble polysulfide is prepared usually by reacting an alkali hydroxide with sulfur with various modifications.

The following examples are illustrative of the invention.

*Example I*

Two liters of a 2-molar solution of $Na_2S_x$, $x=4$ to 5, are prepared by wetting 769.5 grams of sulfur with alcohol and adding to the wetted sulfur with agitation 1500 ml. of a sodium hydroxide solution at 40° C. containing 480 grams of sodium hydroxide. The exothermic reaction is rapid, and the mixture is boiling within five minutes. Agitation must be vigorous to prevent agglomeration of the sulfur and subsequent fusion of the unreacted sulfur. The reaction mixture is allowed to stand at or near the boiling point for fifteen minutes, and the reaction is complete within an hour. The reaction mixture is filtered to remove unreacted sulfur and stored in containers with air excluded to prevent oxidation of the polysulfide.

There can be substituted for the alcohol, a water solution of an alkali-stable wetting agent or triethanolamine. No wetting agent is necessary if the alkali is hot, say 50° C., when mixed with the sulfur. Without a wetting agent or hot alkali, there would be an induction period of 25 to 30 minutes before the reaction would begin at room temperature. The reaction may be catalyzed by the addition of a small amount of sodium polysulfide.

To illustrate the preparation of these organic polysulfides, the following examples are given.

*Example II*

To 300 ml. of the above 2-molar polysulfide solution at 40 to 45° C. containing 6 grams of sodium lignin sulfonate will be added dropwise over a period of three hours with stirring 60 ml. of ethylene dichloride. After 3 ml. are added, the reaction mixture is allowed to stand 15 minutes while the reaction begins before resuming the flow of ethylene dichloride. The course of the reaction is indicated by the change in color of the polysulfide solution from red to yellow. Agitation must be maintained vigorous throughout the addition to secure proper dispersion of the ethylene dichloride. Because of the exothermic nature of the reaction, heat must be removed to prevent the temperature from rising above 55° C. to reduce the loss of ethylene dichloride by volatilization and to obtain a latex of small particle size. Once the addition is complete, agitation is continued for an hour while the temperature is maintained at 50 to 55° C. The finely divided particles are dense and settle rapidly when the agitation is discontinued. The polymer is washed three times with water by decantation. The latex is very stable and does not flocculate during washing.

*Example III*

To 175 ml. of the above 2-molar polysulfide solution warmed to 40° C. is added 1 gram of Petromix #3 (a sulfonated petroleum fraction) as an emulsifying agent. This mixture is put into a flask fitted with a stirrer, thermometer and dropping funnel. 25 ml. of ethylene dichloride is added dropwise over a period of 2 hours with agitation while the temperature is maintained at 40° C. The temperature is then raised to 50° C. and maintained for one hour. The course of the reaction is indicated by the color change. The stirrer is stopped and the polymer, which settles immediately to the bottom of the flask is a fine porous crumb, "bird shot" size, separate from the solution. The product is washed with cold and hot water and dried.

*Example IV*

Readily available equipment can be used for this method of polymer preparation and, where the facilities for heat removal are adequate, the above method may be modified to simplify the addition of the reactants. For example, the materials given in Example II are all mixed together at room temperature, and, for laboratory scale experiment, the mixture was emulsified by passing it through a "hand-homogenizer" four times. Condensation to give a latex of fine particle size takes place at room temperature with only occasional shaking and cooling by tap water to keep the temperature from rising above 45° C. This method can be used for large scale production by using a water-cooled colloid mill to homogenize the materials. The reaction mixture put into an open wood or iron reactor having the necessary temperature-controlling devices is converted to latex quite readily.

Analysis of samples of alkylene polysulfide prepared by my method shows a sulfur content ranging from 76 to 82.5%. It is immaterial whether the emulsifying agent is added to the aqueous solution of the water-soluble polysulfide or to the substituted organic reactant. Either method of combining the ingredients is satisfactory. The preferred amount of emulsifier to be used is about 2% or more based on the polysulfide.

Any of the above-mentioned emulsifiers and types of emulsifiers can be substituted in the above reaction systems and a polymer of the indicated particle size will be formed. If lecithin is employed, it should be dissolved in the substituted organic reactant, for it tends to form water in oil emulsions if the addition of organic reactant is too rapid during condensation. Naphthenates or similar compounds may be added to inhibit this tendency.

This method of organic polysulfide polymer preparation is not limited to ethylene dichloride, for any of the above described disubstituted organic reactants may be employed such as ethylene dibromide, propylene dichloride or dibromide, dihalides of unsaturated hydrocarbon gases derived from pressure-cracking processes, natural gas-cracking processes, disubstituted compounds of which the following are examples:

$$CH_3CHXOCHX'CH_3$$

AA' disubstituted ethyl ether $$XC_2H_4OC_2H_4X'$$

BB' disubstituted ethyl ether $$XCH_2OCH_2X'$$

Disubstituted methyl ether $$XC_2H_4OC_2H_4OC_2H_4X'$$

Disubstituted ethoxy ethyl ether $$XCH_2SCH_2X$$

Disubstituted thio ethyl ether $$XCH_2OCH_2\underset{\underset{CH_3}{|}}{\overset{\overset{CH_3}{|}}{C}}CH_2OCH_2X'$$

Disubstituted 1,3 methoxy 2,2,dimethyl propane $$XCH_2CH_2CH_2OCH_2OCH_2CH_2CH_2X'$$

Disubstituted dipropyl formal $$XCH_2CH_2OCH_2OCH_2CH_2X$$

Disubstituted diethyl formal

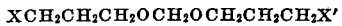

Disubstituted para diethoxy benzene $$XCH_2O CH_2\underset{X'}{\overset{|}{C}}HOCH_3$$

Disubstituted dimethoxy ethane $$XCH_2CH_2O\underset{\overset{\|}{O}}{C}OCH_2CH_2X'$$

Disubstituted diethyl carbonate $$XCH_2\overset{\overset{O}{\|}}{C}OCH_2CH_2O\overset{\overset{O}{\|}}{C}CH_2X'$$

Disubstituted glycol diacetate

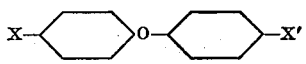

pp' Disubstituted diphenyl ether

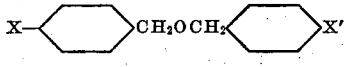

Disubstituted dibenzyl ether $$XCH_2CH_2SO_2CH_2CH_2X'$$

Disubstituted diethyl sulphone $$CH_3CH_2\underset{\underset{X}{|}}{C}HO\underset{\underset{X}{|}}{C}HCH_2CH_3$$

AA' disubstituted propyl ether

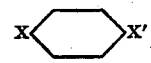

Para disubstituted benzene

Disubstituted para xylene

pp' Disubstituted dibenzyl

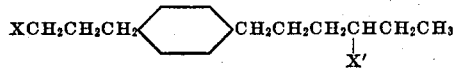

Disubstituted para hexyl propyl benzene

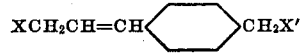

Disubstituted 3 tolyl propene 2 and others as well as compounds having more than two substituents such as 1,1,2 trichlor ethane 1,2,4 trichlor butane, 1,2,3,4 tetrachlor butane, trichlor mesitylene, and the like, can be substituted for ethylene dichloride in the above examples to form their corresponding polysulfide polymers.

It is to be understood that the reaction conditions may be varied when another disubstituted organic compound is employed in place of ethylene dichloride. The use of the above compounds, in which X and X' retain their identity as hereinbefore described, for the preparation of organic polysulfide polymers, is known to those versed in the art.

The other alkali metal polysulfides, alkaline earth polysulfides, ammonium polysulfides, and polysulfides of ethanolamines, may be substituted for sodium polysulfide in the above reactions with comparable results, but, for economic reasons, the use of sodium polysulfides is preferred.

The prior art discloses a process of stabilization of polysulfide solutions by heating at the boiling point of the polysulfide solution for long periods of time up to twenty hours, which appears necessary for good dispersions with magnesium hydroxide. This stabilization process is undesirable since heating destroys polysulfide. The resulting reduction in yield for a given unit of time at 40 to 50° C. is quite marked, about 20% after only three hours of heating.

Since magnesium hydroxide is a poor dispersing agent, the utilization of better dispersing or emulsifying agents eliminates the lengthy and expensive procedure of polysulfide stabilization.

Also, according to previous disclosures, it is necessary to adjust the specific gravity of the polysulfide solution to that of the substituted organic reactant such as ethylene dichloride (1.25) to permit better mixing of the reactants. This is highly essential with alkaline earth hydroxides. It is of no moment if one employs any of the dispersing or emulsifying agents indicated herein. In fact, with these one uses 2-molar polysulfide, specific gravity about 1.60, and enjoys the advantages of higher concentration of reactants. The specific gravity of this solution drops during the course of the condensation from about 1.60 to about 1.30 at the end of the reaction. Higher concentrations of polysulfide when compatible with the mode of preparation can be used.

When a latex is desired, the method described in Example II with its modification as in Example IV will produce a polymer of very small particle size, less than one micron, which remains suspended for long periods of time in spite of high density of the polymer. However, on flocculation with aluminum sulfate, calcium nitrate, and the like, the particles agglomerate to form uniform spherical clumps 1-3 microns in diameter. These settle rapidly and may be washed with hot or cold water to remove the salts formed during the reaction with no loss of stability. Upon redispersion in water with agitation the reformed latex is very stable to heat, alkali, salts, alcohol, or acids and may be evaporated to a paste without coagulation. It is also very stable to friction.

The preparation of the polymer as a "crumb" or a "pellet," without the aid of coagulants, suitable for rapid washing and drying is quite simple, for, as herein described, the size of the crumb or pellet depends on the choice of emulsifying or dispersing agent.

The porous nature of the crumb or pellet lends itself readily to the thorough washing of the polymer which is necessary to remove the undesired by-product salt formed and the unreacted polysulfide. Agitation is required while washing to prevent the crumb from coalescing. Agitation should be continuous since the pellets coalesce very readily in the presence of the alkali polysulfide if allowed to settle out and pack. Once most of the polysulfide is removed, this tendency is reduced and there is little danger of lumping while washing with cold water. When washed with hot water, the polymer softens and agitation must be vigorous to prevent fusion of the pellets.

Well-washed crumbs dry rapidly at low temperatures, 35-45° C. Thus, the washed crumbs can be spread one to two inches deep, and, when dry, fused into sheets by raising the temperature of the drying atmosphere which also serves to reduce the content of the volatiles.

This washed and dried polymer on curing with zinc oxide has a tensile strength of 600-1250 lb./sq. in. and elongations of 150 to 400%. The polymer is exceedingly resistant to solvents and shows almost no swelling in trichlorethane.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed, if desired, without departing from the spirit and scope of the invention as defined in the appended claims.

I claim:

1. The method of producing a stable dispersion containing polyethylene polysulfide particles of a size no greater than about 1 to 3 microns in diameter dispersed in an aqueous medium which comprises preparing an aqueous reaction mixture containing in addition to the aqueous medium only an ethylene dihalide, a water-soluble polysulfide and a lignin sulfonate, and agitating the said reaction mixture while maintaining its temperature between room temperature and about 60° C.

2. The method of producing a stable dispersion containing polyethylene polysulfide particles of a size no greater than about 1 to 3 microns in diameter dispersed in an aqueous medium which comprises preparing an aqueous reaction mixture containing in addition to the aqueous medium only ethylene dichloride, a water-soluble polysulfide and a lignin sulfonate, and agitating the said reaction mixture while maintaining its temperature between room temperature and about 60° C.

3. The method of producing a stable dispersion containing polyethylene polysulfide particles of a size no greater than about 1 to 3 microns in diameter dispersed in an aqueous medium which comprises preparing an aqueous reaction mixture containing in addition to the aqueous medium only ethylene dichloride, an alkali metal polysulfide and a lignin sulfonate, and agitating the said reaction mixture while maintaining its temperature between room temperature and 60° C.

4. The method of producing a stable dispersion containing polyethylene polysulfide particles of a size no greater than 1 to 3 microns in diameter dispersed in an aqueous medium which comprises preparing an aqueous reaction mixture containing in addition to the aqueous medium only ethylene dichloride, sodium polysulfide and a lignin sulfonate, and agitating the said reaction mixture while maintaining its temperature between room temperature and about 60° C.

5. A stable dispersion of polyethylene polysulfide particles of a size no greater than 1 to 3 microns in diameter dispersed in an aqueous medium, prepared by the method of claim 1.

WILLIAM D. STEWART.

REFERENCES CITED

The following references are of record in the file of this patent:

UNITED STATES PATENTS

| Number | Name | Date |
|---|---|---|
| 1,910,441 | Lubs | May 23, 1933 |
| 2,050,370 | Orthner | Aug. 11, 1936 |
| 2,108,468 | Becker | Feb. 15, 1938 |
| 2,151,212 | Kallner | Mar. 21, 1939 |
| 2,195,380 | Patrick | Mar. 26, 1940 |
| 2,232,515 | Arnold | Feb. 18, 1941 |
| 2,261,439 | Kelly | Nov. 4, 1941 |
| 2,386,287 | Blanco | Oct. 9, 1945 |
| 2,406,260 | Ryden | Aug. 20, 1946 |
| 2,419,060 | Edwardes | Apr. 15, 1947 |